(12) United States Patent
Long

(10) Patent No.: US 10,963,484 B2
(45) Date of Patent: Mar. 30, 2021

(54) SYSTEMS AND METHODS FOR USE IN DATA ACCESS

(71) Applicant: MASTERCARD INTERNATIONAL INCORPORATED, Purchase, NY (US)

(72) Inventor: Kenneth L. Long, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 259 days.

(21) Appl. No.: 16/043,539

(22) Filed: Jul. 24, 2018

(65) Prior Publication Data

US 2020/0034559 A1    Jan. 30, 2020

(51) Int. Cl.
G06F 21/62    (2013.01)
G06F 16/27    (2019.01)
G06F 16/22    (2019.01)
G06F 16/23    (2019.01)

(52) U.S. Cl.
CPC .......... *G06F 16/27* (2019.01); *G06F 16/2282* (2019.01); *G06F 16/2358* (2019.01); *G06F 21/6218* (2013.01)

(58) Field of Classification Search
CPC .. G06F 21/6218; G06F 16/27; G06F 16/2282; G06F 16/2358
USPC .......................... 707/610, 781, 615, 626, 634
See application file for complete search history.

(56) References Cited

U.S. PATENT DOCUMENTS

| | | | | |
|---|---|---|---|---|
| 7,587,435 | B2* | 9/2009 | Shepherd | G06F 16/275 707/999.202 |
| 7,680,771 | B2* | 3/2010 | Cialini | G06F 16/217 707/999.003 |
| 9,965,498 | B2* | 5/2018 | Coutts | G06F 16/217 |
| 10,579,478 | B2* | 3/2020 | Shanthaveerappa | G06F 11/1451 |
| 2006/0136448 | A1* | 6/2006 | Cialini | G06F 16/217 707/999.101 |
| 2011/0087633 | A1* | 4/2011 | Kreuder | G06F 16/273 707/610 |
| 2012/0173477 | A1* | 7/2012 | Coutts | G06F 16/217 707/602 |
| 2017/0032012 | A1* | 2/2017 | Zhang | G06F 16/1748 |
| 2018/0121511 | A1* | 5/2018 | Li | G06F 16/2365 |
| 2018/0336103 | A1* | 11/2018 | Sekar | G06F 11/1451 |

* cited by examiner

*Primary Examiner* — Phong H Nguyen
(74) *Attorney, Agent, or Firm* — Harness, Dickey & Pierce, P.L.C.

(57) ABSTRACT

Systems and methods are provided for use in accessing data stored in multiple databases. One exemplary system includes first and second databases. The first database includes a first primary tablespace having first data, a first standby tablespace having first standby data, and a first journal. The first database is configured, in response to a request including a change instruction for the first data, to alter the first data consistent with the change instruction, append a change description indicative of the alteration to the journal, and transmit the journal to the second database. The second database is configured to then receive the journal from the first database and to alter second standby data included in a second standby tablespace of the second database consistent with the change description, thereby maintaining the second standby data in the second standby tablespace as a replicate of the first data in the first primary tablespace.

15 Claims, 3 Drawing Sheets

SYSTEMS AND METHODS FOR USE IN DATA ACCESS

FIELD

The present disclosure is generally directed to systems and methods for use in accessing a database, and in particular, to systems and methods for accessing multiple databases, where each database performs as a primary database and a standby database for data included therein.

BACKGROUND

This section provides background information related to the present disclosure, which is not necessarily prior art.

Data is known to be stored in a database. Access is often provided to the database whereby programs, users, etc., may access and use the data included therein. Data may also be altered in the database, where the alterations may be subject to one or more restrictions. In addition, the database may be replicated and/or copied to ensure maintenance of the data, for example, when one or more errors, faults, or failures affect the database. Within an Oracle® database system, for example, a tool, i.e., Oracle® Data Guard, is provided to manage primary and standby databases, where the primary database is separate from the standby database. At the outset, the primary and standby database are identical and, thereafter, changes, by programs, users, etc., are only permitted to be made at the primary database. When changes are made to the primary database, those changes are recorded to a journal. The journal is then provided to the standby database, whereby the changes are made, and the databases are retained, substantially, as copies of one another. In the above, the primary database is available for read/write of data, while the standby database is either not available or available for read only.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
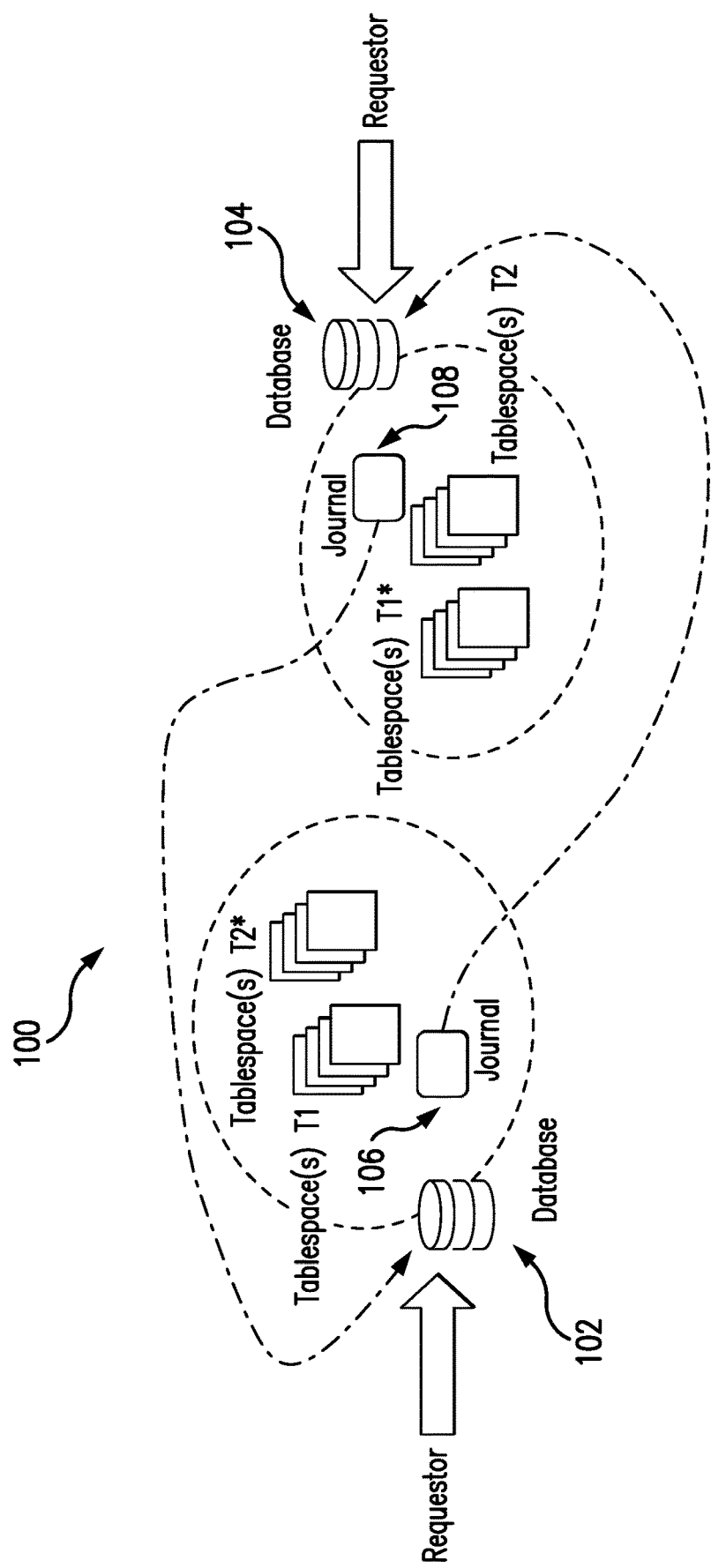
FIG. 1 is an exemplary system of the present disclosure suitable for providing access to data stored in multiple databases.

Exemplary embodiments will now be described more fully with reference to the accompanying drawings. The description and specific examples included herein are intended for purposes of illustration only and are not intended to limit the scope of the present disclosure.

Access to data is often an integral part of internal systems for many entities, including, for example, payment networks, etc. Databases are often structured to preserve the data and functions associated therewith. The Data Guard scheme available with an Oracle® database permits a database to provide read/write instructions/operations to a primary database, while also preserving the data in a standby database (as a copy) (through use of journaling). In this manner, programs, applications, services, users, etc. (broadly, requestors), attempting to perform write instructions/operations, wait for access to the primary database for the data stored therein. Stated another way, the conventional architecture only provides for one of the databases (i.e., the primary database) to be open for read/write and the other databases (i.e., the standby database) to be read only (while providing binary replication of the data in the primary database). The standby database receives the binary data (indicative of changes to the primary database) and applies the changes to the replicated data therein. Further, while the standby database may not be written to (outside of the binary replication), it may be converted to a primary database to enable read/write, but doing so is subject to a delay which may be dependent, for example, upon the data volume in transit and the performance of the network and hardware involved. Said another way, access to the standby database as a primary database is not instantaneous, but requires a transition of the database from standby to primary. Likewise, the primary database would be transitioned, at the same time, to the standby database.

Uniquely, the systems and methods herein divide data between multiple databases and organize each of the multiple databases into primary and standby databases, thereby enhancing the access to the data stored in the multiple databases. In particular, data to be stored is divided into two or more tablespaces, while maintaining redundancy of the data. The first one or more tablespaces of data are provided in a first database (e.g., an Oracle® database, etc.), as the primary database for that data, and the second one or more tablespaces of data are provided in a second database as a primary database for that data, where the first and second tablespaces of data each include different data. Then, each of the first and second data tablespaces are replicated to the other database, whereby the other database is a standby database for the tablespaces (i.e., the second database is the standby database for the first one or more tablespaces of data). The primary databases maintain journals of changes to their respective data tablespaces, and provide the journals to the other standby databases for replication of the data therein. In this manner, each of the databases is accessible for simultaneous read and write operations for at least part of the data stored in the database, while maintaining the data as redundant data (potentially for read only instructions/operations) in the other database. As such, the above architecture provides an enhanced data storage architecture to programs, applications, services, users, etc., whereby speed and flexibility over prior data storage architectures is improved (e.g., by allowing for simultaneous write operations) without sacrificing redundant storage.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, a manner of storing data in databases, a distribution of data among different databases, security and/or maintenance requirements associated with the data and/or databases, etc.

The illustrated system 100 includes two databases 102 and 104. In general, the databases 102 and 104 will be physically separated, but may be in the same room, building, facility, region (e.g., postal code, city, state, territory, country, etc.), etc., or in different buildings, facilities, regions, etc. In this exemplary embodiment, each of the databases 102 and 104 includes an Oracle® database. Again, in general, each of the databases 102 and 104 is provided to manage data in a multiple-user environment, whereby multiple programs, applications, services, users, etc., may access data within the given database. That said, it should be appreciated that the databases 102 and 104 may be other types of databases, for example, which employ and/or are enabled for binary replication, in other system embodiments (e.g., PostgreSQL databases, IBM® DB2 databases, etc.).

As shown in FIG. 1, the system 100 includes data, and, in particular, two sets of tablespace(s) of data (where each set includes one or more tablespaces): data tablespace(s) data_1 or T1, and tablespace(s) data_2 or T2, where each set of tablespace(s) includes different data but collectively comprises all of the data included in the system 100. The data tablespaces may include any type of data, which is of interest to one or more programs, applications, services, users, etc. In this example, the data includes transaction data associated with a payment network, such as, for example, Mastercard®, etc. The transaction data may be divided into data tablespaces in any suitable manner.

When the data is divided into the tablespaces, the database 102 is configured to store the tablespace(s) T1 and also separately the tablespace(s) T2*, which is a duplicate of the data tablespace(s) T2. Similarly, the database 104 is configured to store the tablespace(s) T2 and also separately the tablespace(s) T1*, which is a duplicate of the data tablespace(s) T1. In this way, the database 102 is a primary database for tablespace(s) T1 and the standby database for tablespace(s) T2 (denoted T2*). And, likewise, the database 104 is a primary database for tablespace(s) T2 and the standby database for tablespace(s) T1 (denoted T1*).

As shown in FIG. 1, the databases 102 and 104 include journals 106 and 108, respectively. The journals 106 and 108 may be referred to herein as log files for changes in the primary databases for tablespaces T1 and T2. In particular, the database 102, for example, is configured to permit requestors, such as, for example, programs, applications, services, users, etc. to read data from or write data to tablespace(s) T1, through instructions to read data (e.g., read instructions) or instructions to write data (e.g., change instructions). When data in tablespace(s) T1 is changed (e.g., altered) or written (e.g., consistent with the change instructions, etc.), the database 102 is configured to append an entry to the journal 106, which is indicative of (e.g., describes) the change to the data in tablespace(s) T1. At one or more regular or irregular intervals, or potentially in real time, the database 102 is configured to transmit the journal 106 to the database 104, as indicated by the dotted line in FIG. 1. The interval or real time transmission of the journal 106 (and the journal 108) is a configuration setting of the databases 102 and 104, and may be adjusted, based on a variety of factors, etc. In turn, the database 104 is configured to impose the changes in the journal 106 to the data tablespace(s) T1*. That said, the database 104 is configured to inhibit and/or block other programs, applications, services, users, etc., from committing changes to the data tablespace(s) T1*. What's more, apart from changes in the journal 106, which have not yet been imposed, the tablespace(s) T1* is maintained in the system 100 as a duplicate of the tablespace(s) T1. This may be referred to as binary data replication of tablespace(s) T1 between the databases 102 and 104.

Likewise, the database 104 is configured to permit programs, applications, services, users, etc. to read data from or write data to tablespace(s) T2. When the data in tablespace(s) T2 is changed (e.g., altered), the database 104 is configured to append an entry to the journal 108, which is indicative of (e.g., describes) the change to the data in tablespace(s) T2. At one or more regular or irregular intervals, or potentially in real time, the database 104 is configured to transmit the journal 108 to the database 102, as indicated by the dotted line in FIG. 1. In turn, the database 102 is configured to impose the changes in the journal 108 to tablespace(s) T2*. That said, the database 102 is configured to inhibit and/or block other requestors, such as, for example, programs, applications, services, users, etc., from committing changes or writes to tablespace(s) T2*. As such, apart from changes in the journal 108, which have not yet been imposed, tablespace(s) T2* are maintained in the system 100 as a duplicate of tablespace(s) T2.

It should be appreciated, therefore, that each of the databases 102 and 104 includes a primary "database" for certain data therein (i.e., data in tablespace(s) T1 or T2) and a standby "database" for other data therein (i.e., data in tablespace(s) T1* or T2*), where if the database 102 includes data tablespace(s) T1, database 104 includes standby data tablespace(s) T1*, and vice versa. The data is segregated between the two "databases" (i.e., tablespace(s) T1 and tablespace(s) T2*) within the database 102, for example, by employing unique database identifiers (or IDs) in storing the data, whereby the tablespace(s) (and data therein) are mapped to unique IDs. Specifically, for example, each of the one or more tablespace(s) T1 in database 102 is associated with a unique ID, or a range or set of unique IDs. Each of the one or more tablespace(s) T1* in database 104 (together, storing data duplicative of the data in tablespace(s) T1 in database 102, whereby the tablespace(s) T1* serve as a standby "database" for the data in tablespace(s) T1), then, is associated with the same ID, or range or set of IDs, whereby corresponding data in tablespace(s) T1 in database 102 and tablespace(s) T1* in database 104 may be accessed and/or altered via the same ID, or range or set of IDs. Similarly, for example, each of the one or more tablespace(s) T2 in database 104 is associated with a unique ID, or a range or set of unique IDs. Each of the one or more tablespace(s) T2* in database 102 (together, storing data duplicative of the data in tablespace(s) T2 in database 104, whereby the tablespace(s) T2* serve as a standby "database" for the data in tablespace(s) T2), then, is associated with the same ID, or range or set of IDs, whereby corresponding data in tablespace(s) T2 in database 104 and tablespace(s) T2* in database 102 may be accessed and/or altered via the same ID, or range or set of IDs.

In this manner, the primary "database" within the database 102, for example, is configured to occupy and/or own certain tablespace(s) of the database 102, while the standby "database" is configured to occupy and/or own different, distinct tablespace(s) of the database 102. The databases 102 and 104 are configured to maintain the tablespaces T1 and T2 by logical rules, to thereby strictly enforce the primary-standby distinction based on the unique IDs. Thereafter, the database 102, for example, is configured to determine whether an instruction to read and/or write data is directed to the primary tablespace(s) T1 (and data therein) or standby tablespace(s) T2* (and data therein) based on the unique ID, or range or set of IDs, associated with the instruction and to enforce the primary-standby distinction based on whether the associated unique ID, or range or set of IDs, are mapped to the primary tablespace(s) T1 or standby tablespace(s) T2*. In particular, consistent with the above, the first database 102 (and data therein) is separated into the primary tablespace(s) T1 and the standby tablespace(s) T2* by unique IDs (or ranges or sets of unique IDs), which are unique within the database and define the primary tablespace(s) and standby tablespace(s). For example, one range of unique IDs may define the primary tablespace(s) T1 and another range of unique IDs of may define the standby tablespace(s) T2*. The logical rules by which the tablespaces are maintained will permit read and write operations to tablespace(s) T1 (and data therein), but generally only permit read operations to tablespace(s) T2* (and data therein). So, for example, where the instruction is to write or alter data associated with an ID within a range of unique IDs mapped to the tablespace(s) T2*, the database 102 may determine that the instruction is directed to data in the tablespace(s) T2* and will generally decline the instruction, based on the mapping of unique IDs and the logical rules. Conversely, where the instruction is to read data associated with a range of unique IDs mapped to the tablespace(s) T1, the database 102 may determine that the instruction is directed to data in the tablespace(s) T1 and will generally permit the instruction, based on the mapping of the unique IDs and the logical rules.

It should further be appreciated that in the event of a switchover of the tablespaces of the databases 102 and 104, for example, the tablespace(s) of the database 102 which is the primary tablespace(s) would become the standby tablespace(s), and conversely, the corresponding tablespace(s) of the database 104 which is the standby tablespace(s) would become the primary tablespace(s). In this manner, both databases 102 and 104 may be coordinated to allow data changes to be recorded in the journals to be transmitted and applied based on the unique IDs (i.e., a change to data in tablespace(s) T1 associated with a particular unique ID (or range or set of unique IDs) may be journaled as a change associated with the ID(s) and then applied to tablespace(s) T1* based on the ID(s)). It should further be appreciated that in a failover situation (e.g., based on failure of database 104), the database 102 is configured to convert the standby tablespace(s) in database 102 into primary tablespace(s). In database 102, for example, then, this permits full read/write access to all data from both tablespace(s) T1 and T2* in the database 102.

Figure 2:
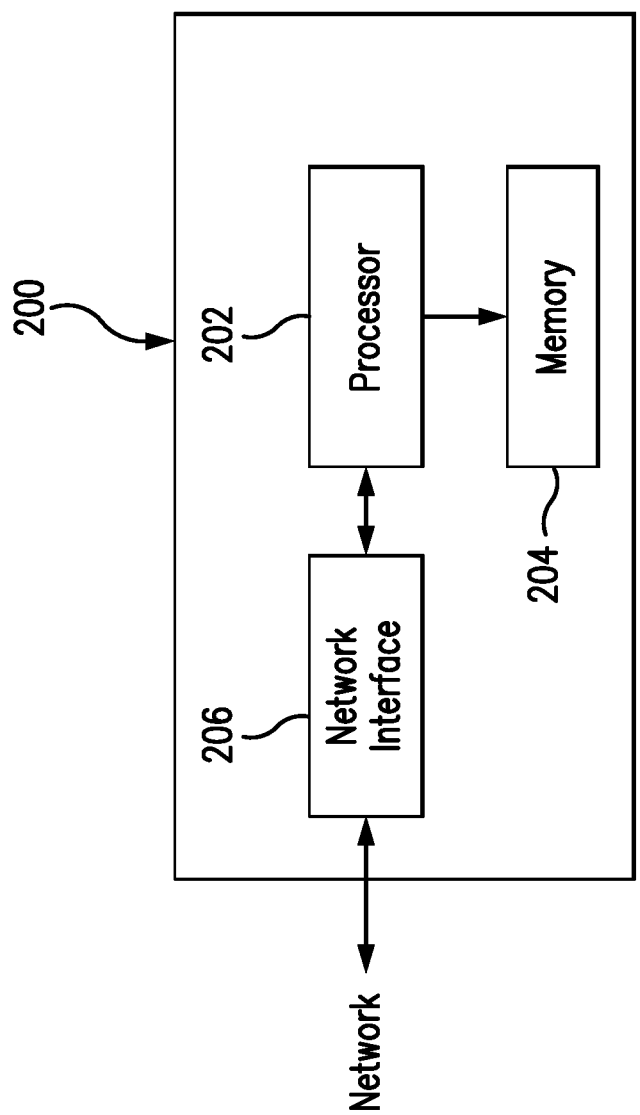
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the databases 102 and 104 is and/or includes a communication device which includes and/or is generally consistent with the computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, primary data tablespace(s), standby data tablespace(s), journals, unique IDs, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

Further, the illustrated computing device 200 also includes a network interface 206 coupled to (and in communication with) the processor 202 and the memory 204. The network interface 206 may include, without limitation, a wired network adapter, a wireless network adapter, a mobile network adapter, or other device capable of communicating to one or more different ones of the networks, and/or with other devices described herein. In some exemplary embodiments, the computing device 200 may include the processor 202 and one or more network interfaces incorporated into or with the processor 202.

Figure 3:
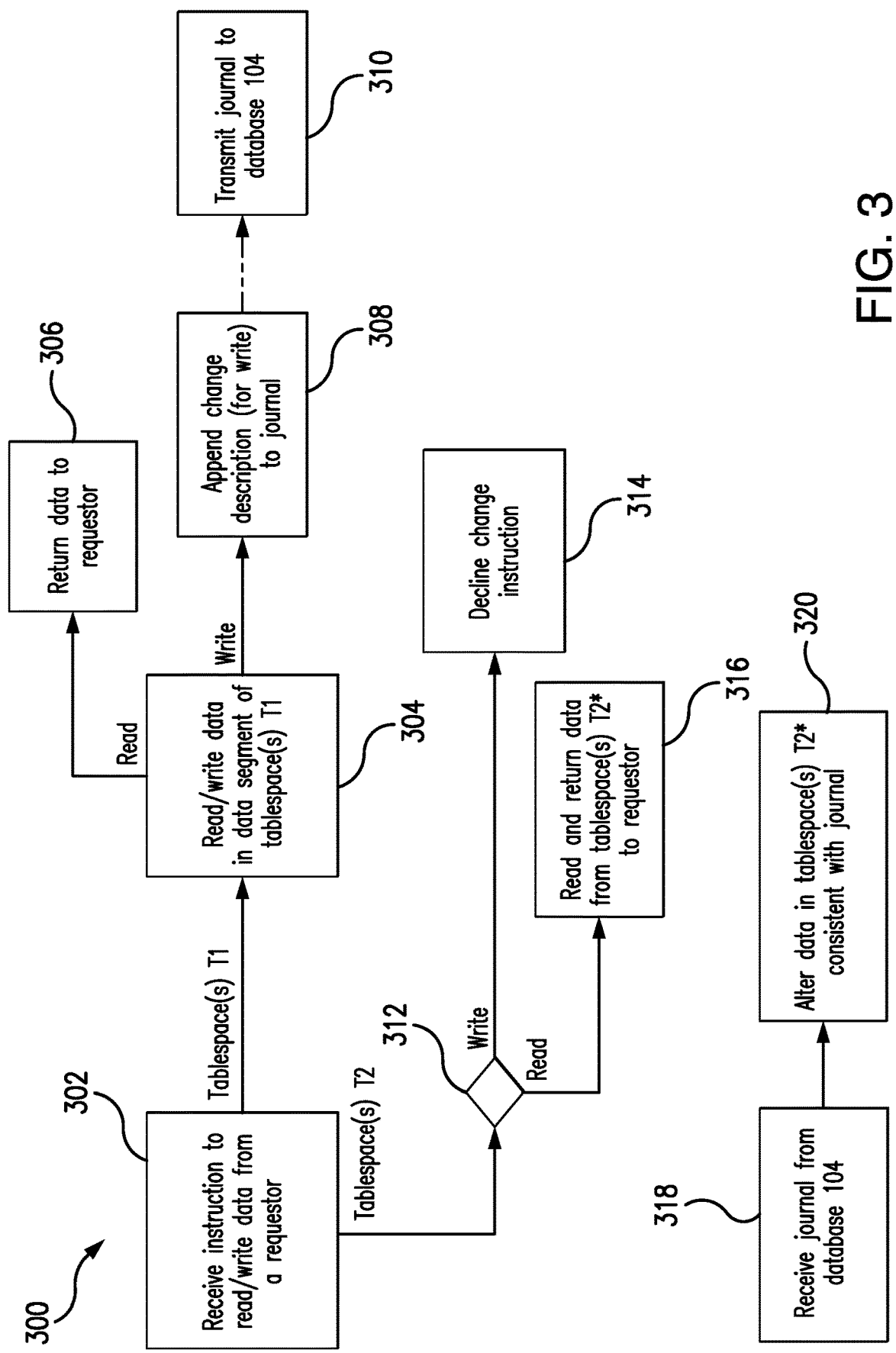
FIG. 3 includes a flow diagram for an exemplary method, which may be implemented in connection with the system of FIG. 1 for providing access to data stored in multiple databases.

FIG. 3 illustrates an exemplary method 300 for use in providing access to data stored in multiple databases. The exemplary method 300 is described as implemented in the databases 102 and 104 and the other parts of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

Also, the method 300 is described with reference to the database 102. That said, it should be appreciated that the description is generally (and equally, but separately) applicable to the database 104, with the references to the specific data tablespace(s) reversed (e.g., where tablespace(s) T1 would instead be referred to as tablespace(s) T2, and where tablespace(s) T2* would instead be referred to as tablespace(s) T1*). Further, at the outset, the database 102 stores first data in primary tablespace(s) T1 and also stores second data in standby tablespace(s) T2*. The second data is a replicate or copy of the data stored in the primary tablespace(s) T2 of the database 104. Likewise, separate from method 300, the database 104 stores the second data in primary tablespace(s) T2 and a copy or replicate of the first data (of the primary tablespace(s) T1 of database 102) in the standby tablespace(s) T1*. In this manner, at the outset, each of the databases 102 and 104 includes identical data.

Then, in method 300, at 302, a requestor (e.g., a program, user, application, etc.) provides a data request to the database 102, which includes an instruction to read data (e.g., a read instruction) from, or an instruction to write data (e.g., a change instruction) to, the database 102. In one example, an online transaction processing (OLTP) application may instruct to perform an insert operation to a data structure (e.g., a transaction log table, etc.) within the data tablespace(s) T1. In another example, a batch program may be employed to instruct loading of settlement or transaction data into a data structure within the tablespace(s) T2, and an extract, transform, load (ETL) program may be employed to provide updating and/or manipulating of data within a data structure of tablespace(s) T2. Each of the data requests identifies data (e.g., based, at least in part, on the unique ID(s) (or range or set of unique IDs) assigned to the tablespace(s) that include the data, etc.), which is specific to either the data tablespace(s) T1 or tablespace(s) T2. As such, the request will generally be directed to and then received at the database 102 when specific to tablespace(s) T1 and the database 104 when specific to tablespace(s) T2. It should be appreciated that data requests may be transmitted from one database to the other database (e.g., when the request includes only instructions to read data, etc.).

It should also be appreciated that the particular data request, as defined by the application from which they are initiated, may be configured and/or directed to either the database 102 or the database 104. As such, for example, an application (e.g., an application of the requestor providing the data request, etc.) may be configured to direct requests that include only instructions to read data from the tablespace(s) T1 to the database 104 (i.e., to the data tablespace(s) T1*), while the application may be configured to direct requests that include write-only instructions to only the database that permits writing of data to the particular data tablespace(s) associated with the request. In this manner, for example, data requests may be directed to the primary tablespace(s) in one database for the specific data (e.g., to alter to the specific data, etc.), but still take advantage of the secondary tablespace(s) at the other database (e.g., to read the specific data, etc.) (e.g., so that simultaneous read and write operations may be performed with respect to the first data, etc.). That said, the requestor may not necessarily direct a request to the appropriate database for various reasons (e.g., user error, etc.). As such, for example, in the method 300 where, as discussed below, there is a received request with an instruction to write, at 312, to a copy or replicate of tablespace(s) T2 (i.e., standby tablespace(s) T2*) in database 102, the instruction is declined, at 314.

In addition, in one or more embodiments, a database (e.g., database 102 or 104, etc.) may, or may not, be configured to direct data requests to a different database (e.g., an appropriate and/or preferred database based on the instruction, etc.). For example, database 102 (and vice versa with respect to database 104) may be configured to, in response to a request from a requestor, which includes a read instruction for data included in tablespace(s) T1, direct the request (and/or the read instruction) to the database 104, whereby the database 104 is configured to read and return the data, from tablespace(s) T1*, to the requestor. As another example, database 102 (and vice versa with respect to database 104) may be configured to, in response to a request from a requestor, which includes a write instruction for tablespace(s) T2*, direct the request (and/or the write instruction) to the database 104, whereby the database 104 is configured to write the data to tablespace(s) T2.

That said, with continued reference to method 300 of FIG. 3, when the instruction relates to the tablespace(s) T1, the database 102 reads data to the tablespace(s) T1, when the instruction is a read instruction operation, at 304, and then returns the read data to the requestor, at 306.

Conversely, when the instruction is a write instruction (e.g., a change instruction), the database 102 writes the data, received from the requestor, to the tablespace(s) T1, at 304 (consistent with the instruction). In connection with the write instruction, the database 102 further appends, at 308, a change description to the journal 106. The change description is provided in a bit level detail and includes the unique ID(s) associated with the tablespace(s) in which the data was written or altered, so that the database 104, which includes a copy of the tablespace(s) T1 (i.e., standby tablespace(s) T1*), may maintain an identical copy of the data by executing the changes in the journal 106 on the tablespace(s) T1*. It should be appreciated that by including the unique ID(s) associated with the tablespace(s) in which the data was written or altered, database 104 may then execute the changes on the tablespace(s) T1* in database 104 based, at least in part, on the unique ID(s) reflected in the journal 106 (which, as discussed above, correspond across tablespace(s) T1 and T1*). After appending the change description, the database 102 transmits, at 310, the journal 106 to the database 104, which is the standby database for the database 102 (i.e., for tablespace(s) T1). The database 102 may transmit the journal at one or more regular or irregular intervals, or potentially, immediately after the write to the tablespace(s) T1 to provide near real-time replication of the data in the standby database. Upon receipt of the journal 106, the database 104 may then alter the data in the tablespace(s) T1* consistent with the change description(s) in the journal 106, whereby the data in tablespace(s) T1* in database 104 replicates data in tablespace(s) T1. In doing so, the database 104 is able to maintain the tablespace(s) T1* as an identical copy or replicate of the tablespace(s) T1 in the database 102. It should therefore be understood that the only alteration or change of the data in the tablespace(s) T1*, in the database 104, is through a journal entry in the journal 106, which is compiled by the database 102 and provided to the database 104, as described above. Moreover, when the database 104 does make changes to the tablespace(s) T1* (based on the journal 106), corresponding change descriptions are not appended to the journal 108 because the journal 108 is limited to writes or alternations to the tablespace(s) T2.

With continued reference to FIG. 3, when the instruction is directed to tablespace(s) T2 (i.e., tablespace(s) T2* in the database 102), the database 102 determines, at 312, whether the instruction includes a read instruction or a write instruction. When the instruction includes a write instruction (e.g., a change instruction), the database 102 declines, at 314, the instruction, thereby not making any change to the tablespace(s) T2 (i.e., tablespace(s) T2* in the database 102). When the instruction includes a read instruction, the database 102 reads and returns, at 316, the data indicated in the instruction to the requestor (i.e., reads and returns data from tablespace(s) T2* in the database 102) (consistent with the instruction).

Apart from the instructions from a requestor, the database 102 further receives, at 318, the journal 108 from the database 104. It should be appreciated that the database 102 is a standby database for tablespace(s) T2 in the database 104. Upon receipt of the journal 108, the database 102 alters the data in the tablespace(s) T2* consistent with the change description(s) in the journal 108, at 320, whereby the data in tablespace(s) T2* replicates data in tablespace(s) T2. It should again be appreciated that the change description(s) include the unique ID(s) associated with the tablespace(s) in which the data was written or altered, whereby the database 102 may then execute the changes on the tablespace(s) T2* in database 102 based, at least in part, on the unique ID(s) reflected in the journal 108 (which, as discussed above, correspond across tablespace(s) T2 and T2*). In doing so, the database 102 is able to maintain the tablespace(s) T2* as an identical copy or replicate of the tablespace(s) T2 in the database 104. It should therefore be understood that the only alteration or change of the data in the tablespace(s) T2*, in the database 102, is through a journal entry in the journal 108, which is compiled by the database 104 and provided to the database 102, as described above. Moreover, when the database 102 does make changes to the tablespace(s) T2* (based on the journal 108), corresponding change descriptions are not appended to the journal 106 because the journal 106 is limited to writes to the tablespace(s) T1.

In view of the above, the systems and methods herein permit enhanced access to data in databases through the above described architecture, where one database includes a primary database and also a standby database for another database. In this manner, data may be accessed, or, specifically, read, from two different locations in two databases, and written to one location in one of the two databases. As compared to one primary database and one secondary database, this architecture permits two write instructions (to data in different tablespace(s)) to be executed at one time, while replicating data within the databases at a binary/physical level through use of journaling, thereby improving speed and efficiency over conventional redundant data storage architectures. This architecture also improves speed and efficiency in a manner that is not well-known, routine, or conventional. For example, it is not well-known, routine, or conventional to maintain data as different primary tablespace(s) across different databases as disclosed herein where each of the different databases also includes a standby tablespace(s) in the same database as one of the tablespace(s), but different from the tablespace(s) which it replicates. Further, it should be appreciated that the terms primary and standby as descriptors of the databases herein should not be limiting of the embodiments herein. What's more, the databases should not be understood as limited to a single database as the systems and methods herein may include and/or may be implemented in multi-tenant database configurations.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein. As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) storing, by a first database, first data in one or more primary tablespaces of the first database; (b) storing, by the first database, second data in one or more standby tablespaces of the first database, the primary tablespaces separate from the standby tablespaces; (c) receiving, by the first database, an instruction to alter data in the first database; (d) when the instruction is directed to the first data, altering, by the first database, the first data included in the primary tablespaces consistent with the instruction, in response to the instruction from a requestor; appending, by the first database, a change description indicative of the altered first data to a journal included in the first database when the first data is altered; and transmitting, by the first database, the journal to a second database, thereby permitting the second database alter data included in the second database to maintain a replicate of the first data in one or more standby tablespaces of the second database; (e) when the instruction is directed to the second data, declining, by the first database the instruction to alter the second data; and (f) altering, by the first database, the second data included in the standby tablespaces of the first database only in response to receipt of a standby journal from the second database and consistent with each change description included in the standby journal, thereby maintaining a replicate of data in the second database in the standby tablespaces of the first database.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in managing access to data stored in multiple databases, the system comprising:

a first database including first one or more primary tablespaces having first data, first one or more standby tablespaces having first standby data, and a first journal, the first database for communicating with a second database including second one more primary tablespaces having second data, second one or more standby tablespaces having second standby data, and a second journal, wherein the first data is different than the second data;

wherein the first database is configured, in response to a request from a requestor, to:

when the request includes a change instruction for first data in the first one or more primary tablespaces:

alter the first data included in the first one or more primary tablespaces consistent with the change instruction;

append a change description indicative of the alteration to the first data to the first journal when the first data is altered; and transmit the first journal to the second database; and when the request includes a change instruction for first standby data in the first one or more standby tablespaces, decline the request from the requestor; and wherein the first database is further configured to receive the second journal from the second database and to alter the first second standby data included in the first one or more standby tablespaces, consistent with a change description included in the second journal indicative of alteration to second data in the second one or more primary tablespaces, thereby maintaining the first one or more standby tablespaces as a replicate of the second one or more primary tablespaces.

2. The system of claim 1, further comprising the second database;

wherein the second database is further configured, in response to a request from a requestor, to:

when the request includes a change instruction for the second data in the second one or more primary tablespaces:

alter the second data included in the second one or more primary tablespaces consistent with the change instruction;

append the change description indicative of the alteration to the second data to the second journal when the second data is altered; and transmit the second journal to the first database; and when the request includes a change instruction for second standby data in the second one or more standby tablespaces, decline the request from the requestor; and wherein the second database is further configured to alter the second standby data included in the second one or more standby tablespaces, consistent with the change description included in the firsts journal, thereby maintaining the second one or more standby tablespaces as a replicate of the first one or more primary tablespaces.

3. The system of claim 2, wherein the first database is further configured, in response to a request from a requestor that includes a read instruction for first standby data included in the first one or more standby tablespaces, to read and return the first standby data to said requestor.

4. The system of claim 3, wherein the second database is further configured, in response to a request from a requestor that includes a read instruction for second standby data included in the second one or more standby tablespaces, to read and return the second standby data to said requestor.

5. The system of claim 1, wherein the first database is further configured, in response to a request from a requestor that includes a read instruction for first data included in the first one or more primary tablespaces, to direct the read instruction to the second database.

6. The system of claim 1, wherein the first data in the first one or more primary tablespaces is associated with a first set of one or more database identifiers of the first database; and wherein the first standby data in the first one or more standby tablespaces is associated with a second set of one or more database identifiers of the first database, which are different than the first set of one or more database identifiers.

7. A computer-implement method for use in managing data stored in multiple databases, the method comprising:

storing, by a first database, first data in one or more primary tablespaces of the first database;

storing, by the first database, second data in one or more standby tablespaces of the first database, the one or more primary tablespaces separate from the one or more standby tablespaces, the first data different than the second data;

receiving, by the first database, an instruction to alter data in the first database;

in response to the instruction being directed to the first data:
  altering, by the first database, the first data included in the one or more primary tablespaces consistent with the instruction, and in response to receipt of the instruction;
  appending, by the first database, a change description indicative of the altered first data to a journal included in the first database when the first data is altered; and
  transmitting, by the first database, the journal to a second database, thereby permitting the second database to alter data included in the second database to maintain a replicate of the first data in one or more standby tablespaces of the second database;
in response to the instruction being directed to the second data, declining, by the first database, the instruction to alter the second data in the one or more standby tablespaces; and
altering, by the first database, the second data included in the one or more standby tablespaces of the first database only in response to receipt of a standby journal from the second database and consistent with each change description included in the standby journal, thereby maintaining a replicate of data in the second database in the one or more standby tablespaces of the first database.

8. The computer-implemented method of claim 7, further comprising:
  receiving, by the first database, a second instruction from a requestor to read second data in the first database; and
  reading and returning the second data to the requestor.

9. The computer-implemented method of claim 7, further comprising:
  receiving, by the first database, a second instruction from a requestor to read first data in the first database; and
  directing, by the first database, the second instruction to the second database, thereby permitting the second database to read and return the replicate of the first data included in the one or more standby tablespaces of the second database in response to the second instruction.

10. The computer-implemented method of claim 7, further comprising determining whether the instruction is directed to the first or second data based on a database identifier associated with the instruction being included in a first range of identifiers of the first database specific to the first data or in a second range of identifiers of the first database specific to the second data.

11. The computer-implemented method of claim 7, wherein the first database includes an Oracle® database included in a facility, and the second database includes an Oracle® database disposed away from said facility.

12. A system for use in managing access to data stored in multiple databases, the system comprising:
  a first database including first one or more primary tablespaces having first data, first one or more standby tablespaces having first standby data, and a first journal, and
  a second database including second one more primary tablespaces having second data, second one or more standby tablespaces having second standby data, and a second journal;
wherein the first database is configured, in response to a request from a requestor, to:
  when the request includes a change instruction for first data in the first one or more primary tablespaces:
    alter the first data included in the first one or more primary tablespaces consistent with the change instruction;
    append a change description indicative of the alteration to the first data to the first journal when the first data is altered; and
    transmit the first journal to the second database; and
  when the request includes a change instruction for first standby data in the first one or more standby tablespaces, decline the request from the requestor;
wherein the second database is configured to receive the first journal from the first database and to alter the second standby data included in the second one or more standby tablespaces, consistent with the change description included in the first journal, thereby maintaining the second one or more standby tablespaces as a replicate of the first one or more primary tablespaces; and
wherein the second database is further configured, in response to a request from a requestor, to:
  when the request includes a change instruction for second data in the second one or more primary tablespaces:
    alter the second data included in the second one or more primary tablespaces consistent with the change instruction;
    append a change description indicative of the alteration to the second data to the second journal when the second data is altered; and
    transmit the second journal to the first database; and
  when the request includes a change instruction for second standby data in the second one or more standby tablespaces, decline the request from the requestor;
wherein the first database is further configured to receive the second journal from the second database and to alter the first standby data included in the first one or more standby tablespaces, consistent with the change description included in the second journal, thereby maintaining the first one or more standby tablespaces as a replicate of the second one or more primary tablespaces.

13. The system of claim 12, wherein the first database is further configured, in response to a request from a requestor that includes a read instruction for first standby data included in the first one or more standby tablespaces, to read and return the first standby data to said requestor.

14. The system of claim 13, wherein the second database is further configured, in response to a request from a requestor that includes a read instruction for second standby data included in the second one or more standby tablespaces, to read and return the second standby data to said requestor.

15. The system of claim 12, wherein the first database is further configured, in response to a request from a requestor that includes a read instruction for first data included in the first one or more primary tablespaces, to direct the read instruction to the second database.

* * * * *